(12) United States Patent
Monson et al.

(10) Patent No.: US 7,213,800 B2
(45) Date of Patent: *May 8, 2007

(54) CONSOLE DISPLAY MOUNTING SYSTEM

(75) Inventors: Robert James Monson, St. Paul, MN (US); Julia Ann Neuman, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/631,557

(22) Filed: Jul. 31, 2003

(65) Prior Publication Data
US 2004/0037996 A1    Feb. 26, 2004

Related U.S. Application Data

(62) Division of application No. 10/225,317, filed on Aug. 21, 2002.

(51) Int. Cl.
*F16M 1/00* (2006.01)

(52) U.S. Cl. .................... 267/140; 40/606.01; 362/559

(58) Field of Classification Search .......... 267/140.11, 267/152, 153, 140; 362/559; 40/541; 248/636, 248/638
See application file for complete search history.

(56) References Cited

U.S. PATENT DOCUMENTS

| | | | | |
|---|---|---|---|---|
| 3,563,525 A | * | 2/1971 | Narabu | 267/140 |
| 3,779,536 A | * | 12/1973 | Lachmann | 267/140 |
| 5,479,285 A | * | 12/1995 | Burke | 349/58 |
| 6,206,557 B1 | * | 3/2001 | Sakuma et al. | 362/559 |
| 6,339,531 B1 | * | 1/2002 | McKain et al. | 361/685 |
| 6,554,262 B2 | * | 4/2003 | Monson et al. | 267/140 |
| 2004/0036205 A1 | * | 2/2004 | Monson et al. | 267/140.11 |

* cited by examiner

*Primary Examiner*—Chris Schwartz
(74) *Attorney, Agent, or Firm*—Jacobson & Johnson

(57) ABSTRACT

A shock mount to support the static weight of a housing while at the same time effectively attenuating shock or vibration imparted to the housing with the shock mount having a shock isolator for supporting the weight of the display and a bezel extending around the display with the bezel comprising a second shock an d vibration isolator that coacts with the first shock set of shock isolators to further attenuate shock and vibration forces to the system.

15 Claims, 2 Drawing Sheets

CONSOLE DISPLAY MOUNTING SYSTEM

This application is a division, of application Ser. No. 10/225,317, filed Aug. 21, 2002, (status, abandoned, pending, etc.).

FIELD OF THE INVENTION

This invention relates to a mounting system and, more specifically, to a display mounting system that can coactively isolate a display from shock and vibration forces.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

In order to protect equipment from shock and vibration forces shock isolators are employed that attenuate shock and vibration to a support structure to protect the equipment carried by the support structure. Typically, equipment such as consoles have integral visual displays which are isolated from shock and vibration as a whole console unit. The present invention provides a shock isolation system that can separately isolate the display from shock and vibration, forces, yet can be made to appear as if the display is an integral part of the console. A further feature of the invention is that the mounting system permits one to replace the display without having to remove or replace a portion of the console since the display is removably mounted on the console.

The present invention can provide shock and vibration attenuation through the coaction of two separate shock isolators, a first shock isolator that supports the display on the console and a second shock isolator that peripherally surrounds the display and coacts with the first shock isolator to provide enhanced shock and vibration attenuation.

Elastomeric isolators employed in the prior art are commonly formed into geometric 3D shapes, such as spheres, squares, right circular cylinders, cones, rectangles and the like as illustrated in U.S. Pat. No. 5,776,720. These elastomeric isolators are typically attached to a housing to protect equipment within the housing from the effects of shock and vibration.

Various elastomeric materials have been used, or suggested for use, to provide shock and/or vibration damping as stated in U.S. Pat. No. 5,766,720, which issued on Jun. 16, 1998 to Yamagisht, et al. These materials include natural rubbers and synthetic resins such as polyvinyl chlorides, polyurethane, polyamides polystyrenes, copolymerized polyvinyl chlorides, and poloyolefine synthetic rubbers as well as synthetic materials such as urethane, EPDM, styrene-butadiene rubbers, nitrites, isoprene, chloroprenes, propylene, and silicones. The particular type of elastomeric material is not critical but urethane material sold under the trademark Sorbothane® is currently employed. Suitable material is also sold by Aero E.A.R. Specialty Composites, as Isoloss VL. The registrant of the mark Sorbothane® for urethane material is the Hamiltion Kent Manufacturing Company (Registration No. 1,208,333), Kent, Ohio 44240.

Generally, the shape and configuration of elastomeric isolators have a significant effect on the shock and vibration attenuation characteristics of the elastomeric isolators.

The prior art elastomeric isolators are generally positioned to rely on an axial compression of the elastomeric material or on tension or shear of the elastomeric material. Generally, if the elastomeric isolator is positioned in the axial compressive mode the ability of the elastomeric isolator to attenuate shock and vibration is limited by the compressive characteristics of the material. On the other hand, in the axial compressive mode the elastomeric isolators can be used to provide static support to a housing, which allows a single elastomeric isolator to be placed beneath the housing to support the static weight of the housing. It is the shear type of elastomeric isolators which are preferred for use in the present invention.

SUMMARY OF THE INVENTION

A shock mount to statically and dynamically support the weight of a housing while at the same time effectively attenuating shock or vibration forces imparted to the system with the shock mount having a first shock isolator for supporting the weight of the display and an elastomer bezel extends onto a portion of the display with the bezel functioning as a second shock and vibration isolator that coacts with the first shock isolator to further attenuate shock and vibrations force to the system

DESCRIPTION OF THE PREFERRED EMBODIMENT

Figure 1:
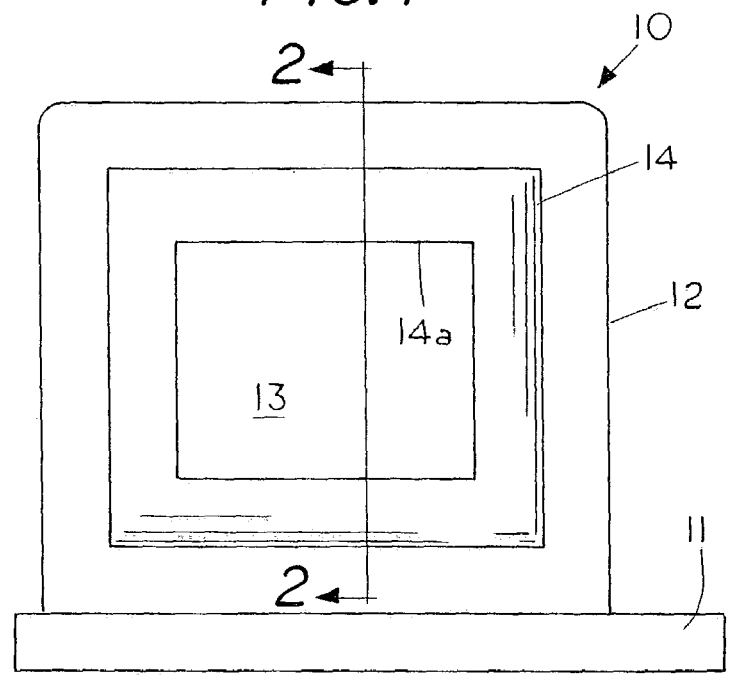
FIG. 1 is a front view of a console supported by two types of shock isolators.

FIG. 1 shows a front view of a console 10 having a display 13 supported by the shock mount of the present invention. Console 10 includes a support structure 12 and an extension 11 for holding a keyboard or the like. "Mounted to support structure 12 is display 13 which has an opaque elastomer bezel 14 having a front peripheral lip 14a secured to a front face of a visual information displaying surface portion of the display 13 to provide an esthetically pleasing appearance over 360 degrees." (Emphasis added.) Typically, display 13 can be any type of device that presents visual information to a user.

Figure 2:
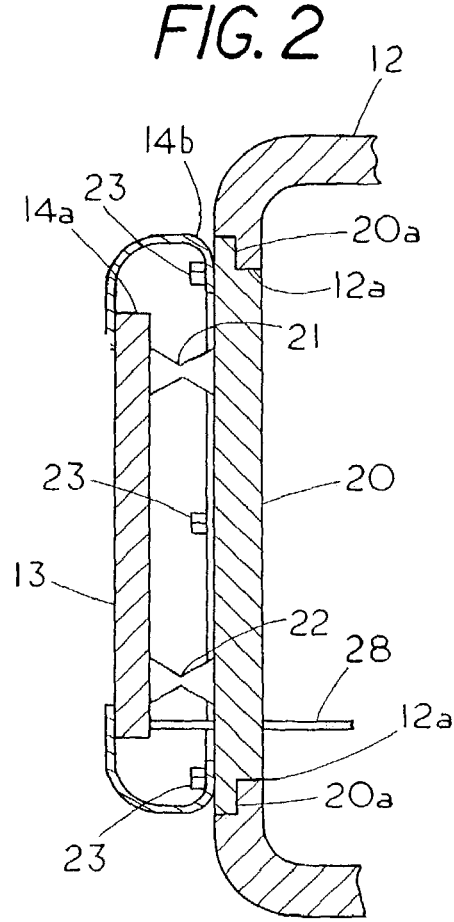
FIG. 2 is a cross sectional view taken along lines 2—2 of FIG. 1 showing the elastomer shock isolators and an elastomer bezel carried the support structure.

FIG. 2 shows a cross sectional view of the console 10 showing the support structure 12 supporting a removable base 20. Removable base 20 include a mounting edge comprising a stepped a peripheral edge 20a to allow one to position the removable base 20 in a mating peripheral engagement with peripheral extension 12a on support structure 12.

Figure 5:
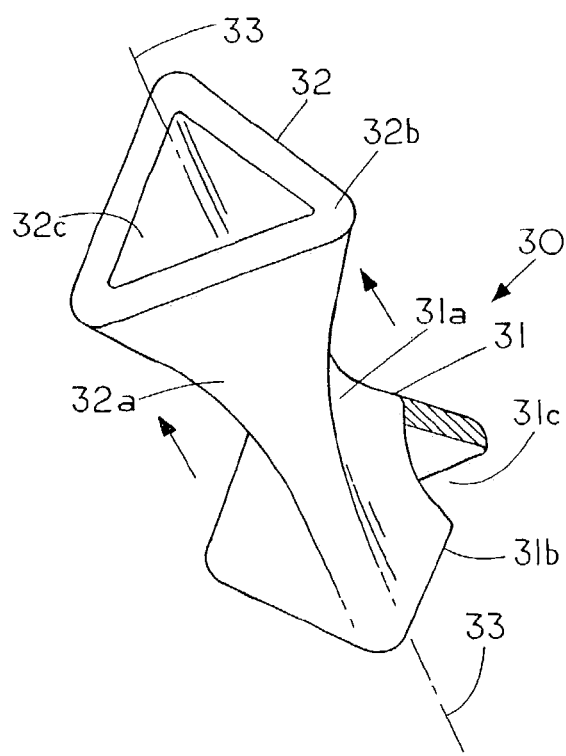
FIG. 5 is a perspective view of a double triad elastomer shock isolator.

The sheet elastomer bezel 14, which extends around the peripheral region of display 13, has a first peripheral end or display attaching lip 14a secured to display 13 and a second peripheral end or base attachment lip 14b secured to removable base 20 through a set of fasteners 23. Supporting display 13 is a first and second elastomer mount 21 and 22. The shock isolators 21 and 22 each have a first end support surface and a second end support surface with the first end support surface and the second end support surface laterally offset other so that a force on the first end support is cantileverly supported to place the elastomer in a shear condition rather than a compression condition and a force on the second end support is cantileverly supported to place the elastomer in a shear condition rather than a compression condition. Elastomer mounts 21, 22 are preferably of the type shown in my copending patent application Ser. No. 09/779,423 filed Feb. 28, 2001, titled DOUBLE TRIAD ELASTOMER MOUNT which is hereby incorporated by reference. The application discloses an elastomer shock isolator that is positioned in the shear or tension mode as opposed to an axial compression mode. Such elastomeric isolators provide enhanced shock and vibration attenuating characteristics in response to dynamic forces due to shock and vibration. FIG. 5 is a perspective view of the double triad one-piece shock isolator 30 disclosed in the Ser. No. 09/779,423 for providing shock and vibration attenuation while providing axially offset support to an object. Isolator 30 is a one-piece two-tetrahedron elastomer shock isolator 30 that simultaneously isolates shocks and supports a static load. Shock isolator 30 has a set of integral elastomer side walls forming a first tetrahedron elastomer shell 31 with a tetrahedron shaped cavity 31c therein and a second tetrahedron elastomer shell 32 having a set of integral elastomer side walls forming a second tetrahedron elastomer shell with a tetrahedron shaped cavity 32c therein.

A central axis 33 is shown extending through an apex end 32a of elastomer shell 32 and an apex end 31a of elastomer shell 31. FIG. 2 shows apex end 31a and apex end 32a are smoothly joined to each other at junction surface 39 to form the one-piece two-tetrahedron elastomer shock isolator.

FIG. 1 shows the top tetrahedron elastomer shell 32 has a triangular shaped base end that forms a first support surface 32b. Similarly, the bottom tetrahedron elastomer shell 31 has a triangular shaped base end that forms a second support surface 31b. The conjunction of the apex ends of the two-tetrahedron elastomer shells provides an integral force transfer region between the triangular shaped base ends 31b and 32b of the two-tetrahedron elastomer shells 31 and 32.

In order to provide shear resistance the base ends 31b and 32b are laterally offset with respect to the conjoined area 35 (FIG. 3) which occurs at the conjunction of the apex ends of tetrahedron elastomer shells 31 and 32. That is, a line parallel to axis 33 that extends through base end or first support surface 32b does not extend through the conjoined area 35 between the apex of the two-tetrahedron elastomers 31 and 32. Similarly, a line parallel to axis 33 that extends through the second base end or support surface 31b does not extend through the conjoined area between the two apex ends 31a and 32a of the two-tetrahedron elastomers 31 and 32. Consequently, forces applied to base ends produce shear within the elastomer. These type of elastomer shock isolator which functions in the shear mode is more fully shown and described in my copending application Ser. No. 09/779,423 is hereby incorporated herein by reference.

FIG. 2 shows the elastomer bezel 14 in a slack condition wherein a curvature of the elastomer bezel is visible. That is, bezel 14 is sufficiently long so as to be positioned in a curved condition which is referred to as mounting the bezel 14 in a slack condition. This condition normally occurs around the entire periphery of the display 13 when the elastomer bezel 14 is in the relaxed condition, i.e. a condition where the static forces are supported by the elastomer shock isolators 21 and 22.

Figure 3:
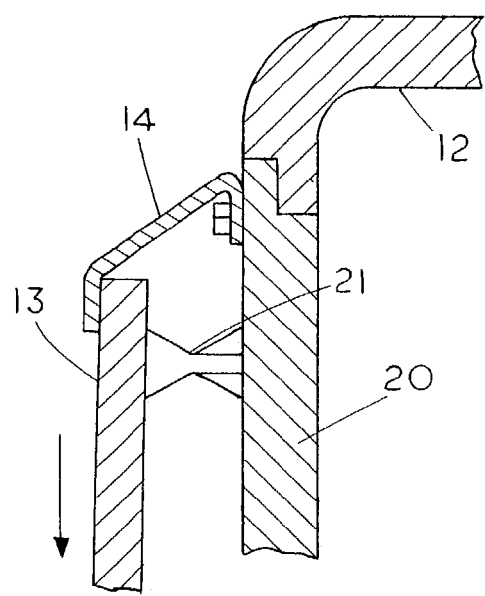
FIG. 3 is a partial cross sectional view of the bezel in a tension condition to provide shock and vibration attenuation to the display.

FIG. 3 shows a portion of the removable base and elastomer bezel 14 illustrating the condition when shock and vibration forces have displaced display 13. In this condition, due to downward displacement of display 13 relative to removable base 20, the elastomer bezel 14 is now in a taut or tension condition. When the elastomer bezel is in a tension condition as illustrated in FIG. 3 further elongation of elastomer bezel is resisted resulting in the bezel 14 coacting with the elastomer shock mount 21 to further inhibit shock and vibration forces. That is, the elastomer bezel is sufficient flexible so as to offer little resistance to flexing when in the slack mode but has sufficient internal integrity to offer substantial resistance to elongation of bezel 14 when the bezel is in the taut condition as shown in FIG. 3. At the same time the bezel 14 provides an aesthetically pleasing appearance around the peripheral region of display 13.

Figure 4:
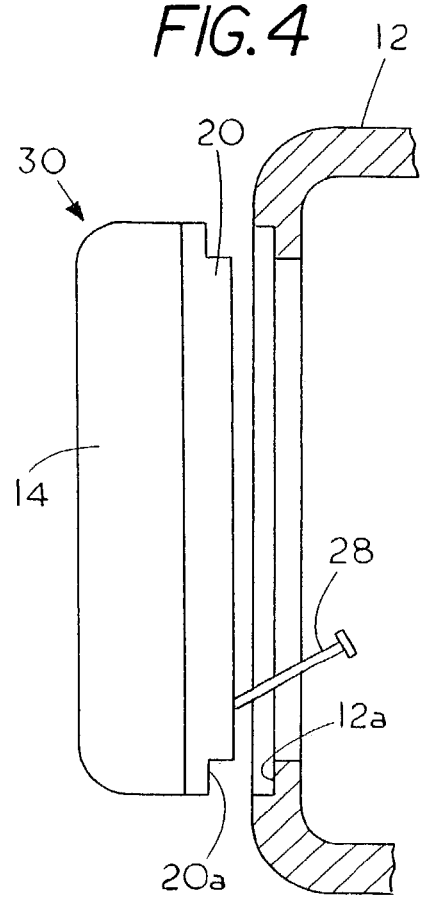
FIG. 4 shows the support structure in cross sectional view with a removable base about to be secured to the support structure.

FIG. 4 shows a partial cross section of the support structure 12 and a side view of the shock isolated unit 30 with removable base 20 and bezel 14. The peripheral lip edge 20a of removable base forms mating engagement with the peripheral lip 12a in support structure 12a so a user can insert and mount the shock isolated unit 30 into the support structure 12. This greatly facilitates replacing a display that may malfunction including any shock isolators since the shock isolated unit 30 carries the shock isolator 21 and elastomer bezel 14 as a unitary component. An operator need only secure the removable base 20 to the support structure with fasteners (not shown) and attach the display power cable 28 to the console.

While the display 13 is shown in a vertical mount the display 13 can be mounted in horizontal or any other orientation with the present invention.

The present invention also includes a method of shock isolating a display from a support housing by supporting a display 13 with an elastomer shock isolator 21 positioned on an interior region of a display 13. One can then secure first peripheral lip 14a of elastomer bezel to the display 13. One can secure a second peripheral lip 14b of the elastomer bezel 14 to the base 20 to thereby provide coactive shock and vibration protection to the display unit.

In order to produce coactive shock isolation one mounts the bezel 14 in a slack condition as shown in FIG. 2 so that the elastomer shock isolators 21 and 22 provide primary shock and vibration attenuation and the bezel 14 provides secondary shock and vibration attenuation as the bezel is brought into a taut condition.

In addition, the invention can include the step of mounting of the elastomer bezel 14 and elastomer isolators 21, 22 to a removable base 20 to permit the unitary removable and replacement of the display 13 as a shock isolated unit as well as the step of securing the base 20 to a support structure 12.

We claim:

1. A shock mount for simultaneously isolating shock and vibration forces and for supporting a static load comprising:
   a display, a support structure, a removable base mounted on said support structure;

a shock isolator having a first end directly engaged to the base and a second end directly engaged to a visual information displaying surface portion of the display to coactively provide shock and vibration attenuation; and an elastomer bezel having a first end attached to the base and a second end attached to a front face portion of the display with the bezel in a relaxed condition where a static force is supported by the shock isolator and in a tension condition when subject to shock and vibration forces to thereby coactively provide shock and vibration attenuation.

2. The shock mount of claim 1 including a plurality of shock isolators.

3. The shock mount of claim 2 wherein the elastomer bezel comprises a one-piece sheet elastomer.

4. The shock mount of claim 3 wherein the elastomer bezel includes a peripheral display attachment lip.

5. The shock mount of claim 4 wherein the elastomer bezel includes a base attachment lip.

6. The shock mount of claim 5 wherein the peripheral display attachment lip includes a 360 degree display engagement surface.

7. The shock mount of claim 1 wherein the shock isolator comprises a one-piece elastomer shock isolator having a first end and a second end cantileverly connected so that a force on the first end places the shock isolator in a shear condition rather than a compression condition.

8. A replaceable shock isolated unit for simultaneously isolating shocks and for supporting a static load comprising:

a removable base;

a display;

a shock isolator having a first end directly engaged to the removable base and a second end directly engaged to the display to coactively provide shock and vibration attenuation; and an elastomer bezel secured to an outer peripheral face region of said display, said elastomer bezel having a first end secured to the removable base and a second end secured to a front face portion of the display to coactively provide shock and vibration attenuation.

9. The shock isolated unit of claim 8 wherein the base includes a mounting edge for removably mounting the base in a console housing.

10. The shock isolated unit of claim 8 wherein the elastomer bezel is sufficiently long so as to permit mounting said bezel in a slack condition.

11. The shock isolated unit of claim 10 wherein the shock isolator provides primary shock and vibration isolation for the display and said bezel provides secondary shock and vibration isolation when the slack condition of the bezel becomes a tension restraint.

12. The shock isolated unit of claim 8 including a set of fasteners for securing said bezel to said base.

13. The shock isolated unit of claim 8 wherein the bezel second end comprises a peripheral lip secured to the front face portion of the display.

14. The shock isolated unit of claim 8 wherein the bezel first end comprises a peripheral lip secured to the removable base to permit the unitary removable and replacement of the display as part of the shock isolated unit.

15. The shock isolated unit of claim 8 wherein the shock isolator has a first end support surface and a second end support surface with the first end support surface and the second end support surface cantileverly supporting each other to place the elastomer in a shear condition rather than a compression condition in response to a compressive force on either the first end support surface or the second end support surface.

* * * * *